US008793128B2

(12) United States Patent
Miki

(10) Patent No.: US 8,793,128 B2
(45) Date of Patent: Jul. 29, 2014

(54) SPEECH SIGNAL PROCESSING SYSTEM, SPEECH SIGNAL PROCESSING METHOD AND SPEECH SIGNAL PROCESSING METHOD PROGRAM USING NOISE ENVIRONMENT AND VOLUME OF AN INPUT SPEECH SIGNAL AT A TIME POINT

(75) Inventor: Kiyokazu Miki, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 13/365,848

(22) Filed: Feb. 3, 2012

(65) Prior Publication Data

US 2012/0271630 A1 Oct. 25, 2012

(30) Foreign Application Priority Data

Feb. 4, 2011 (JP) ................................ 2011-022915

(51) Int. Cl.
*G10L 15/00* (2013.01)
*G10L 15/20* (2006.01)

(52) U.S. Cl.
USPC ............ 704/233; 704/226; 704/258; 704/260

(58) Field of Classification Search
USPC ................................ 704/226, 233, 258, 260
See application file for complete search history.

(56) References Cited

U.S. PATENT DOCUMENTS

| | | | | | |
|---|---|---|---|---|---|
| 5,664,019 | A * | 9/1997 | Wang et al. | | 381/71.1 |
| 5,960,391 | A * | 9/1999 | Tateishi et al. | | 704/232 |
| 6,119,086 | A * | 9/2000 | Ittycheriah et al. | | 704/267 |
| 6,847,931 | B2 * | 1/2005 | Addison et al. | | 704/260 |
| 7,260,533 | B2 * | 8/2007 | Kamanaka | | 704/260 |
| 7,684,982 | B2 * | 3/2010 | Taneda | | 704/233 |
| 8,000,962 | B2 * | 8/2011 | Doyle et al. | | 704/240 |
| 8,150,688 | B2 * | 4/2012 | Iwasawa | | 704/233 |
| 8,219,396 | B2 * | 7/2012 | Cho et al. | | 704/231 |
| 8,285,344 | B2 * | 10/2012 | Kahn et al. | | 455/570 |
| 8,311,820 | B2 * | 11/2012 | Ranjan | | 704/233 |
| 2004/0015350 | A1 * | 1/2004 | Gandhi et al. | | 704/235 |
| 2004/0102975 | A1 * | 5/2004 | Eide | | 704/258 |
| 2004/0162722 | A1 * | 8/2004 | Rex et al. | | 704/211 |
| 2004/0215454 | A1 * | 10/2004 | Kobayashi et al. | | 704/231 |
| 2012/0027216 | A1 * | 2/2012 | Tirry et al. | | 381/57 |

FOREIGN PATENT DOCUMENTS

| | | |
|---|---|---|
| JP | 2000-039900 A | 2/2000 |
| JP | 2007-156364 A | 6/2007 |

* cited by examiner

*Primary Examiner* — Shaun Roberts
(74) *Attorney, Agent, or Firm* — Sughrue Mion, PLLC

(57) ABSTRACT

A speech signal processing system that includes a speech input unit for inputting a speech signal; input speech storage unit for storing an input speech signal that is the speech signal inputted through the speech input unit; characteristic estimation unit for referring to the input speech signal stored in the input speech storage unit, and estimating characteristics of an input speech indicated by the input speech signal, the characteristics including an environmental sound included in the input speech signal; reference speech output unit for causing a predetermined speech signal that becomes a reference speech, to output; and characteristic adding unit for adding the characteristics of the input speech estimated by the characteristic estimation unit, in a reference speech signal that is the speech signal caused to output by the reference speech output unit.

10 Claims, 6 Drawing Sheets

SPEECH SIGNAL PROCESSING SYSTEM, SPEECH SIGNAL PROCESSING METHOD AND SPEECH SIGNAL PROCESSING METHOD PROGRAM USING NOISE ENVIRONMENT AND VOLUME OF AN INPUT SPEECH SIGNAL AT A TIME POINT

This application claims priority from Japanese patent application No. 2011-022915. filed on Feb. 4, 2011, the disclose of which is incorporated herein in its entirety by reference.

BACKGROUND

1. Field

The present invention relates to a speech signal processing system, a speech signal processing method and a speech signal processing method program that include a speech signal conversion process, and relates to a speech signal processing system, a speech signal processing method and a speech signal processing method program that use characteristics such as a noise environment and a volume of an input speech.

2. Description of the Related Art

An example of a speech conversion system that performs speech signal conversion is described in Japanese Unexamined Patent Publication No. 2000-39900 (hereinafter "Patent Literature 1"). The speech conversion system described in Patent Literature 1 has a speech input unit 1, an input amplifier circuit, a variable amplifier circuit, and a speech synthesis unit as components, and operates to mix an environmental sound that has been inputted from the speech input unit 1 and has passed through the input amplifier circuit, and a speech outputted from the speech synthesis unit, in the variable amplifier circuit, and to output a synthesized speech that has been converted.

Moreover, Japanese Unexamined Patent Publication No. . 2007-156364 (hereinafter "Patent Literature 2") describes a speech recognition apparatus that synthesizes a normalized noise model obtained by normalizing a noise model synthesized from an acoustic characteristic amount of a digital signal in a noise section, with a clean speech model, to generate a normalized noise-superimposed speech model, and uses a normalized noise model obtained by normalizing it, as an acoustic model, to obtain a speech recognition result.

However, in a method of synthesizing a speech by always superimposing the environmental sound at a current time point as described in Patent Literature 1, there is a problem that the environmental sound at a time point when a speech for speech recognition has been inputted (in other words, a time point when a user has intentionally inputted the speech, that is, any time point for the user) cannot be superimposed. Moreover, similarly, there is a problem that characteristics of the speech inputted for the speech recognition cannot be added. For example, the characteristics of the input speech, such as a volume, and distortion of a signal due to a high or low volume (including blocking of a speech signal, mainly due to a failure in a communication path) cannot be added.

Moreover, in a technique described in Patent Literature 2, when speech conversion is performed, such an attempt to use characteristics such as a noise environment and a volume of a particular speech is not considered at all. Moreover, the speech recognition apparatus described in Patent Literature 2 is not configured to be applicable for such use. This is because the technique described in Patent Literature 2 is a technique for normalizing the noise model in order to improve speech recognition result accuracy for a speech mixed with a noise.

Consequently, an object of the present invention is to provide a speech signal processing system, a speech signal processing method and a speech signal processing program that preferably use the characteristics such as the environmental sound such as a noise, the volume of the input speech, and the blocking of the speech signal, at the time point when the speech for the speech recognition has been inputted.

SUMMARY

A speech signal processing system according to an aspect of an exemplary embodiment is characterized by including speech input unit for inputting a speech signal; input speech storage unit for storing an input speech signal that is the speech signal inputted through the speech input unit; characteristic estimation unit for referring to the input speech signal stored in the input speech storage unit, and estimating characteristics of an input speech indicated by the input speech signal, the characteristics including an environmental sound included in the input speech signal; reference speech output unit for causing a predetermined speech signal that becomes a reference speech, to output; and characteristic adding unit for adding the characteristics of the input speech estimated by the characteristic estimation unit, in a reference speech signal that is the speech signal caused to output by the reference speech output unit.

Moreover, a speech signal processing method according to an aspect of another exemplary embodiment is characterized by including inputting a speech signal; storing an input speech signal that is the inputted speech signal; referring to the stored input speech signal, and estimating characteristics of an input speech indicated by the input speech signal, the characteristics including an environmental sound included in the input speech signal; causing a predetermined speech signal that becomes a reference speech, to output; and adding the estimated characteristics of the input speech, in a reference speech signal that is the speech signal caused to output as the reference speech.

Moreover, a speech signal processing program according to an aspect of another exemplary embodiment is characterized by causing a computer including input speech storage unit for storing an input speech signal that is an inputted speech signal, to execute a process of inputting a speech signal; a process of storing the input speech signal into the input speech storage unit; a process of referring to the input speech signal stored in the input speech storage unit, and estimating characteristics of an input speech indicated by the input speech signal, the characteristics including an environmental sound included in the input speech signal; a process of causing a predetermined speech signal that becomes a reference speech, to output; and a process of adding the estimated characteristics of the input speech, in a reference speech signal that is the speech signal caused to output as the reference speech.

Advantageous Effects of Invention

According to an aspect of another exemplary embodiment, with respect to the predetermined reference speech, a converted speech can be generated in which the characteristics such as the environmental sound such as the noise, the volume of the input speech, and the blocking of the speech signal, at the time point when the speech for the speech recognition has been inputted, have been added.

For example, a noise-superimposed speech that has been superimposed with the environmental sound at the time point when the speech for the speech recognition has been inputted can be outputted. Moreover, in addition to the environmental sound, for example, the reference speech in which the characteristics of the speech inputted for the speech recognition have been added can be outputted.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

A First Exemplary Embodiment

Figure 1:
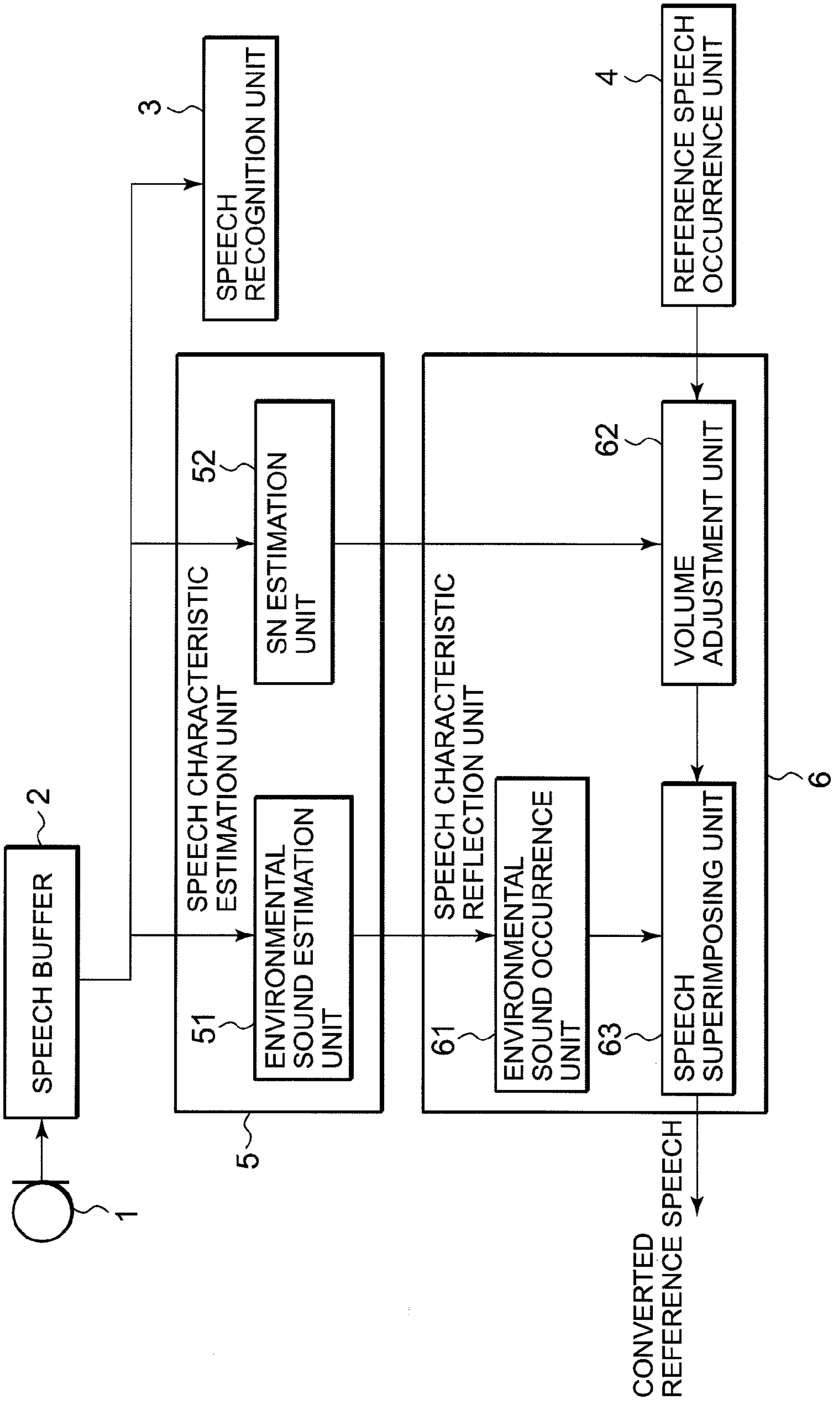
FIG. 1 is a block diagram showing a configuration example of a speech conversion system of an exemplary embodiment.

Hereinafter, A first exemplary embodiment will be described with reference to the drawings. FIG. 1 is a block diagram showing a configuration example of a speech conversion system of a first exemplary embodiment. The speech conversion system shown in FIG. 1 includes a speech input unit 1, a speech buffer 2, a speech recognition unit 3, a reference speech output unit 4, a speech characteristic estimation unit 5, and a speech characteristic adding unit 6.

The speech input unit 1 inputs a speech as an electrical signal (speech signal) into this system. In the first exemplary embodiment, the speech input unit 1 inputs a speech for speech recognition. Moreover, the speech signal inputted by the speech input unit 1 is stored as speech data into the speech buffer 2. The speech input unit 1 is realized, for example, by a microphone. It should be noted that unit for inputting the speech is not limited to the microphone, and for example, can also be realized by speech data reception unit for receiving the speech data (speech signal) via a communication network, or the like.

The speech buffer 2 is a storage device for storing the speech signal inputted through the speech input unit 1, as information indicating the speech targeted for the speech recognition.

The speech recognition unit 3 performs a speech recognition process for the speech signal stored in the speech buffer 2.

The reference speech output unit 4 causes a reference speech targeted for environmental sound superimposition, to output. It should be noted that "causes . . . to output" describes that a state is achieved where a corresponding speech signal has been inputted to this system, and includes any operation therefor. For example, not only generating it, but also obtaining it from an external apparatus is included. Moreover, in the first exemplary embodiment, the reference speech is a speech referred to for speech conversion, and is a speech that becomes a basis of the conversion. For example, if the speech conversion system of the first exemplary embodiment is incorporated as a noise-superimposed speech output function unit into an automatic speech response system, the reference speech may be a guidance speech that is selected or generated depending on a speech recognition process result for the input speech.

For example, the reference speech output unit 4 may use a speech synthesis technique to generate the reference speech. Moreover, for example, a previously recorded speech can also be used as the reference speech. Moreover, the speech may be inputted each time in response to a user's instruction. It should be noted that, in this case, the speech inputted for the speech recognition is distinguished from the reference speech.

The speech characteristic estimation unit 5 estimates characteristics (including an environmental sound) of the inputted speech. In the first exemplary embodiment, the speech characteristic estimation unit 5 includes an environmental sound estimation unit 51 and an SN estimation unit 52.

The environmental sound estimation unit 51 estimates, for the speech signal stored in the speech buffer 2 as a target, information on the environmental sound included in the speech indicated by this speech signal. The information on the environmental sound is, for example, a signal of a non-speech portion that is mainly included near a starting end or an ending end of the speech signal, a frequency property, a power value, or a combination thereof. Moreover, the estimation of the information on the environmental sound includes, for example, dividing the inputted speech signal into a speech and a non-speech, and extracting the non-speech portion. For example, a publicly known Voice Activity Detection technique can be used for extracting the non-speech portion.

The SN estimation unit 52 estimates, for the speech signal stored in the speech buffer 2 as a target, an SN ratio (a ratio of the speech signal to the environmental sound) of the speech indicated by this speech signal. At this time, a clipping sound and jumpiness (partial missing of a signal) in the speech signal may be detected.

The speech characteristic adding unit 6 adds the characteristics of the speech obtained by the speech characteristic estimation unit 5, to the reference speech (converts the reference speech). In other words, for the reference speech, a converted speech in which the characteristics of the speech obtained by the speech characteristic estimation unit 5 have been added is generated. In the first exemplary embodiment, the speech characteristic adding unit 6 includes an environmental sound output unit 61, a volume adjustment unit 62, and a speech superimposing unit 63.

The environmental sound output unit 61 causes the environmental sound to output (generates it) based on the information on the environmental sound that is estimated by the speech characteristic estimation unit 5 (more specifically, the environmental sound estimation unit 51).

The volume adjustment unit 62 adjusts the reference speech to be an appropriate speech, based on the SN ratio estimated by the speech characteristic estimation unit 5 (more specifically, the SN estimation unit 52). More specifically, for the environmental sound caused to output by the environmental sound output unit 61, the volume adjustment unit 62 adjusts a volume or the like of the reference speech so that the reference speech caused to output by the reference speech output unit 4 reaches the estimated SN ratio.

At this time, not only the volume of the reference speech is adjusted so that the estimated SN ratio is faithfully realized, but also the volume of the reference speech can be adjusted to be smaller so that the environmental sound is emphasized. Moreover, the adjustment of the reference speech can also be performed so that the clipping sound and the jumpiness are reproduced. Specifically, a frequency, a percentage and a distribution of the clipping sound, and a frequency, a percentage and a distribution of the jumpiness, which are obtained from the speech signal stored in the speech buffer 2, may be adjusted to be reproduced also in the reference speech (the clipping sound and the jumpiness may be inserted in the reference speech).

The speech superimposing unit 63 superimposes the environmental sound generated by the environmental sound output unit 61, and the reference speech adjusted by the volume adjustment unit 62, to generate a reference speech in which acoustics and the characteristics of the input speech have been added. Here, a reference speech having characteristics equivalent to the acoustics and the characteristics of the input speech is generated by a conversion process.

It should be noted that, in the first exemplary embodiment, the speech characteristic estimation unit 5 (more specifically, the environmental sound estimation unit 51, and the SN estimation unit 52), and the speech characteristic adding unit 6 (more specifically, the environmental sound output unit 61, the volume adjustment unit 62, and the speech superimposing unit 63) are realized, for example, by an information processing unit such as a CPU operating according to a program. It should be noted that the respective units may be realized as a single unit, or may be realized as separate units, respectively.

Figure 2:
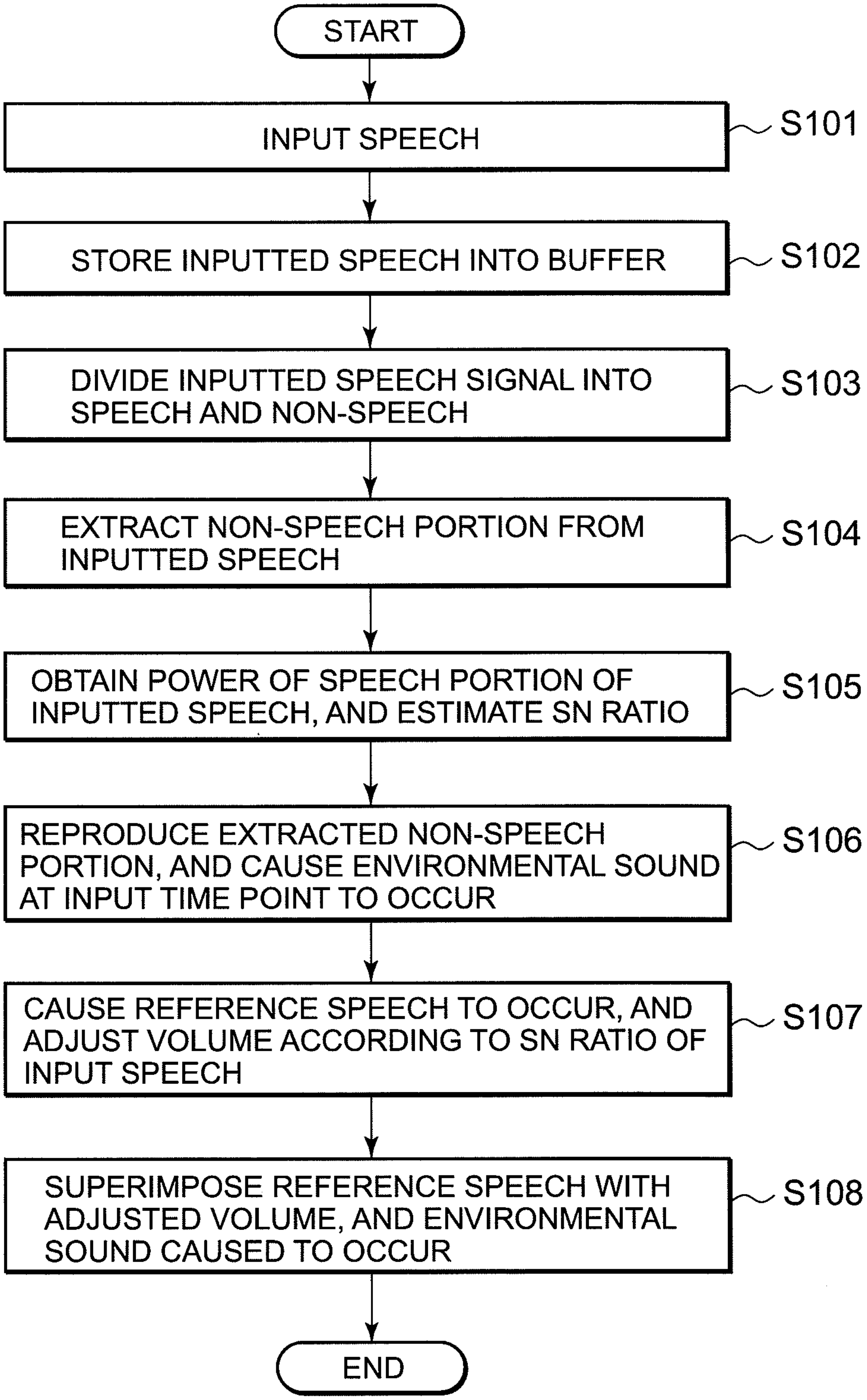
FIG. 2 is a flowchart showing an example of operations of the speech conversion system of an exemplary embodiment.

Next, operations of the first exemplary embodiment will be described. FIG. 2 is a flowchart showing an example of the operations of the speech conversion system of the first exemplary embodiment. As shown in FIG. 2, first, the speech input unit 1 inputs the speech (step S101). For example, the speech input unit 1 inputs a speech spoken by the user for the speech recognition, as the speech signal. Then, the inputted speech is stored in the speech buffer 2 (step S102).

Next, for the input speech signal stored in the speech buffer 2, the environmental sound estimation unit 51 divides this speech into a speech section and a non-speech section (step S103). Then, the non-speech portion is extracted from the input speech (step S104). For example, the environmental sound estimation unit 51 performs a process of clipping a signal of a portion corresponding to the non-speech portion in the speech signal.

On the other hand, the SN estimation unit 52 obtains powers of the non-speech portion and a speech portion of the inputted speech signal, and estimates the SN ratio (step S105). It should be noted that, here, the SN estimation unit may detect the clipping sound and the jumpiness (the partial missing of the signal) in the speech signal, and obtain the frequencies, the percentages and the distributions of output thereof.

In the first exemplary embodiment, what is stored in the speech buffer 2 is assumed to be a continuous speech signal (a single speech signal). For example, for speech data of three minutes, if a single continuous portion of the clipping sound continues for one minute, the frequency of the clipping sound may be calculated as once, and the percentage may be calculated as ⅓. Moreover, regarding the distribution, for example, a relative position of a phenomenon relative to the speech signal may be obtained in which the clipping sound outputs in 30 seconds at a beginning and in 30 seconds at an end of the speech signal, or the like.

It should be noted that a plurality of speech signals can also be stored in the speech buffer 2. In a case of a setting for enabling the plurality of them to be stored, the plurality of stored speech signals may be used to obtain the frequencies, the percentages, the distributions and the like of the clipping sound and the jumpiness. In that case, a noise environment and speech characteristics obtained by synthesizing noise environments and speech characteristics of input speeches at predetermined past times (a plurality of times) are used to generate the converted speech.

Next, in response to completion of the process of clipping the non-speech portion, the environmental sound output unit 61 generates the environmental sound in the input speech, based on the extracted signal of the non-speech portion (step S106). For example, the environmental sound output unit 61 may cause the environmental sound at a time point when the speech has been inputted, to output by repeatedly reproducing the signal of the non-speech portion extracted in step S104.

Next, the reference speech output unit 4 is caused to cause the reference speech to output, and the volume adjustment unit 62 adjusts the volume of the reference speech according to the SN ratio obtained in step S105 (step S107). It should be noted that a timing of the output of the reference speech is not limited thereto, and may be any timing. It may be previously caused to output, or may be caused to output in response to the user's instruction.

Lastly, the speech superimposing unit 63 superimposes the reference speech with the adjusted volume, and the environmental sound caused to output in step S106, to generate and output the reference speech in which the characteristics (such as the environmental sound, the SN ratio, as well as the frequencies, the percentages and the distributions of the clipping sound and the jumpiness) at the time point when the speech has been inputted have been added (step S108).

As above, according to the first exemplary embodiment, a configuration is provided in which the speech signal of the speech inputted for the speech recognition is stored in the speech buffer 2; the environmental sound and the characteristics of the speech at the time point when the speech for the speech recognition has been inputted are estimated from the stored speech signal; and a predetermined reference speech is converted so that the environmental sound and the characteristics are added. Thus, it is possible to output a speech signal having any utterance content in which the environmental sound and the characteristics of the speech at the time point when the speech for the speech recognition has been inputted have been added.

Second Exemplary Embodiment

Figure 3:
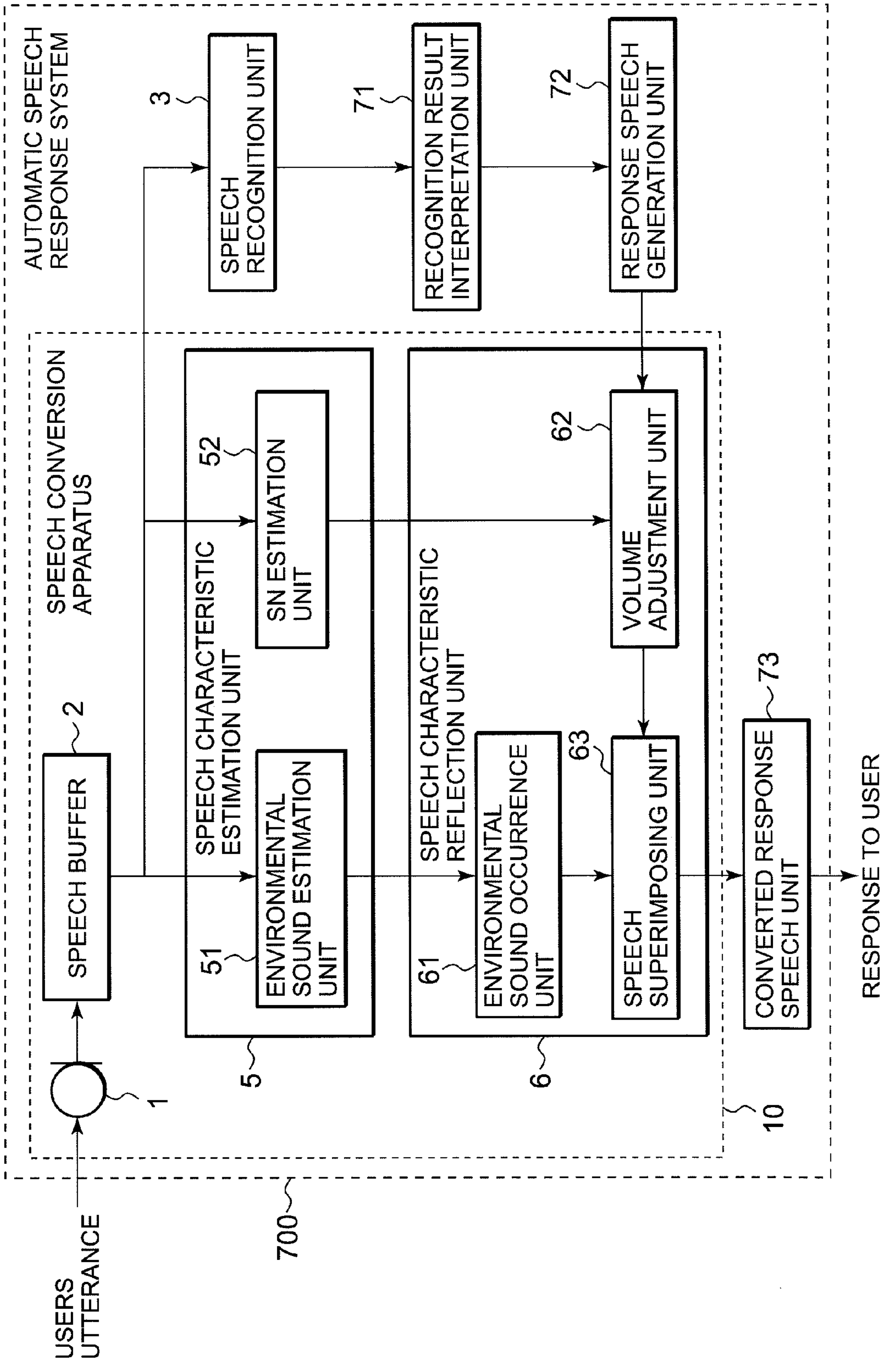
FIG. 3 is a block diagram showing a configuration example of an automatic speech response system of another exemplary embodiment.

Next, a second exemplary embodiment will be described with reference to the drawings. In the second exemplary embodiment, an aspect will be described in which a speech conversion method according to the present invention is applied to the automatic speech response system, as one of speech signal processing methods. FIG. 3 is a block diagram showing a configuration example of the automatic speech response system of the second exemplary embodiment. An automatic speech response system 200 shown in FIG. 3 includes a speech conversion apparatus 10, the speech recognition unit 3, a recognition result interpretation unit 71, a response speech generation unit 72, and a converted response speech unit 73.

The speech conversion apparatus 10 is an apparatus including the speech input unit 1, the speech buffer 2, the speech characteristic estimation unit 5, and the speech characteristic adding unit 6 in the speech conversion system of the first exemplary embodiment. It should be noted that, in the example shown in FIG. 3, an example is shown in which the speech conversion apparatus 10 is incorporated as a single apparatus into the automatic speech response system. However, it does not necessarily need to be incorporated as a single apparatus, and it only needs to include respective processing units included in the speech conversion apparatus 10, as the automatic speech response system. Functions of the respective processing units are similar to the speech conversion system of the first embodiment. It should be noted that, in the second exemplary embodiment, the speech input unit 1 inputs a speech uttered by the user.

The speech recognition unit 3 performs the speech recognition process for the speech signal stored in the speech buffer 2. In other words, the speech recognition unit 3 converts the utterance by the user, into text.

The recognition result interpretation unit 71 extracts meaningful information in this automatic speech response system, from recognition result text outputted from the speech recognition unit 3. For example, if this automatic speech response system is an automatic airline ticketing system, information "place of departure: Osaka" and "place of arrival: Tokyo" is extracted from an utterance (recognition result text) "from Osaka to Tokyo".

The response speech generation unit 72 is a processing unit corresponding to an second exemplary embodiment of the reference speech output unit 4 in the first embodiment. The response speech generation unit 72 generates an appropriate response speech (the reference speech in the speech conversion apparatus 10) from a result of interpretation by the recognition result interpretation unit 71. For example, in the above described example, a confirmation speech such as "Is it right that your place of departure is Osaka?" or a speech for performing ticket reservation such as "A ticket from Osaka to Tokyo will be issued" may be generated. It should be noted that the recognition result interpretation unit 71 may perform a process until determination of content of the response speech from the interpretation result, and the response speech generation unit 72 may perform a process of generating a speech signal having utterance content that is the content as instructed by the recognition result interpretation unit 71. It should be noted that the content of the response speech is not questioned.

Here, while a general automatic speech response system outputs the generated response speech directly to the user, in the second exemplary embodiment (that is, the automatic speech response system in which the speech conversion apparatus according to the present invention is incorporated), the speech characteristics at a time when the speech for the speech recognition (here, the user's utterance speech) has been inputted are added to the response speech.

Consequently, the response speech generation unit 72 inputs the generated response speech as the reference speech into the volume adjustment unit 62 of the speech conversion apparatus 10.

It should be noted that, in the speech conversion apparatus 10, similarly to the first embodiment, when the user's utterance speech is inputted through the speech input unit 1, the speech signal thereof is stored in the speech buffer 2, and with reference to the stored speech signal, the speech characteristic estimation unit 5 estimates the SN ratio of the inputted speech signal, and also, the speech characteristic adding unit 6 generates the environmental sound in the input speech.

In such a state, when the reference speech (response speech) is inputted to the speech conversion apparatus 10, the volume adjustment unit 62 adjusts the volume of the reference speech according to the estimated SN ratio, and the speech superimposing unit 63 superimposes the reference speech with the adjusted volume, and the generated environmental sound, to generate the reference speech (a converted response speech) in which the characteristics (such as the environmental sound, the SN ratio, as well as the frequencies, the percentages and the distributions of the clipping sound and the jumpiness) at the time point when the user's utterance speech has been inputted have been added.

The converted response speech unit 73 performs speech output of the converted response speech outputted from a speech conversion unit 10 (more specifically, the speech superimposing unit 63), as a response to the user from this automatic speech response system.

In this way, since the environmental sound and the characteristics of the speech at a time when the user has uttered are added to the response speech from the system, the user can hear the response speech and instinctively judge whether or not an acoustic environment at the time when the user has uttered toward the system has been suitable for the speech recognition, by himself, depending on how easy it is to hear or how difficult it is to hear, while the system side is not conscious of where the user is located, when the user has spoken, and the like.

It should be noted that, in consideration of a fact that a hearing capability of a human is generally higher relative to a hearing capability of a speech recognition apparatus that automatically performs the speech recognition with a computer, the characteristics of the input speech, such as the environmental sound, the clipping sound and the jumpiness, may be emphasized more than those estimated from an actual input speech, and may be added to the reference speech (system response). Thereby, the user's determination of whether or not the acoustic environment at the time of the user's own utterance has been suitable can be more appropriate.

It should be noted that, as an emphasis process, for example, the reference speech may be converted so that the environmental sound caused to output is loudened (or the reference speech is diminished) to degrade the SN ratio more than in reality, or degrees (the frequencies, the percentages and the like) of the clipping sound and the jumpiness are increased more than in reality.

Third Exemplary Embodiment

Figure 4:
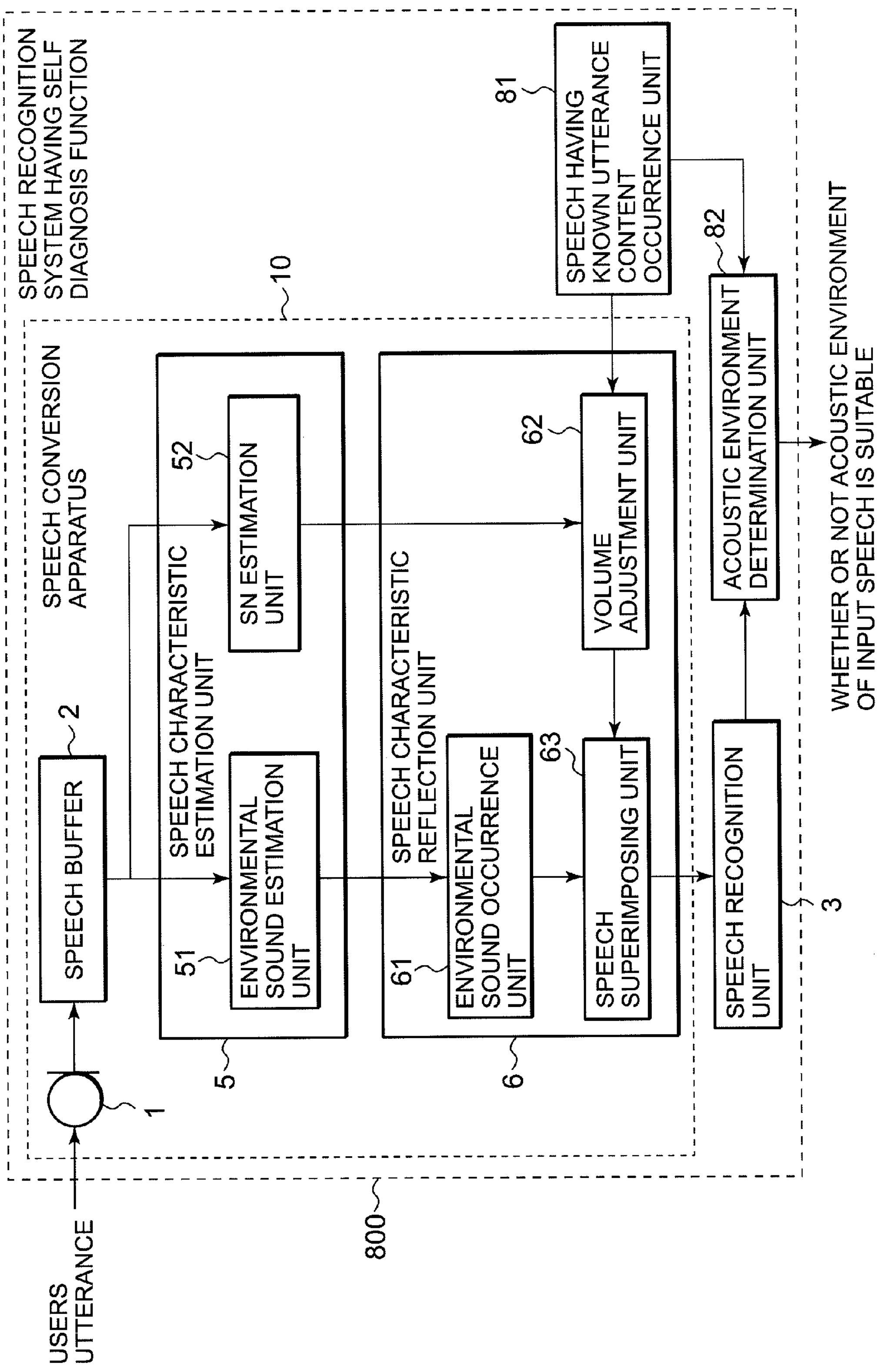
FIG. 4 is a block diagram showing a configuration example of a speech recognition system having a self-diagnosis function of a third embodiment.

Next, a third exemplary embodiment will be described with reference to the drawings. In the third exemplary embodiment, an aspect will be described in which the speech conversion method according to the present invention is applied to a speech recognition system having a self-diagnosis function, as one of the speech signal processing methods. FIG. 4 is a block diagram showing a configuration example of the speech recognition system having the self-diagnosis function of the third exemplary embodiment. A speech recognition system having a self-diagnosis function 800 shown in FIG. 4 includes the speech conversion apparatus 10, the speech recognition unit 3, a speech having known utterance content output unit 81, and an acoustic environment determination unit 82.

Similarly to the second exemplary embodiment, the speech conversion apparatus 10 is the apparatus including the speech input unit 1, the speech buffer 2, the speech characteristic estimation unit 5, and the speech characteristic adding unit 6 in the speech conversion system of the first exemplary embodiment. It should be noted that, in the example shown in FIG. 4, an example is shown in which the speech conversion apparatus 10 is incorporated as a single apparatus into the speech recognition system having the self-diagnosis function. However, it does not necessarily need to be incorporated as a single apparatus, and it only needs to include the respective processing units included in the speech conversion apparatus 10, as the speech recognition system having the self-diagnosis function. Functions of the respective processing units are similar to the speech conversion system of the first exemplary embodiment. It should be noted that, in the third exemplary embodiment, the speech input unit 1 inputs the speech uttered by the user.

In the third exemplary embodiment, the speech recognition unit 3 performs the speech recognition process for the speech signal outputted from the speech conversion apparatus 10 (more specifically, the speech superimposing unit 63). In other words, the speech recognition unit 3 converts a converted reference speech in which the acoustic environment of the input speech from the user and the characteristics of the speech have been added, into text.

The speech having known utterance content output unit 81 is a processing unit corresponding to an embodiment of the reference speech output unit 4 in the first embodiment. The speech having known utterance content output unit 81 causes a speech whose utterance content is known in this system (Hereinafter, referred to as "speech having the known utterance content".) to output as the reference speech. The speech having the known utterance content may be a speech signal obtained by uttering previously decided content in a noiseless environment. It should be noted that the utterance content is not questioned. It may be selected from a plurality of pieces of the utterance content according to an instruction, or the user may be caused to input the utterance content. Then, in addition to the utterance content, information on a parameter to be used in conversion to the speech signal, a speech model and the like may also be caused to be inputted together.

The acoustic environment determination unit 82 compares a result of the recognition of the converted reference speech by the speech recognition unit 3, with the utterance content of the reference speech generated by the speech having known utterance content output unit 81, to obtain a recognition rate for the converted reference speech. Then, based on the obtained recognition rate, it is determined whether or not the acoustic environment of the input speech is suitable for the speech recognition. For example, if the obtained recognition rate is lower than a predetermined threshold, the acoustic environment determination unit 82 may determine that the acoustic environment of the inputted speech, that is, the acoustic environment at the time point (a location and the time) when the user has inputted the speech, is not suitable for the speech recognition. Then, information indicating it is outputted to the user.

Figure 5:
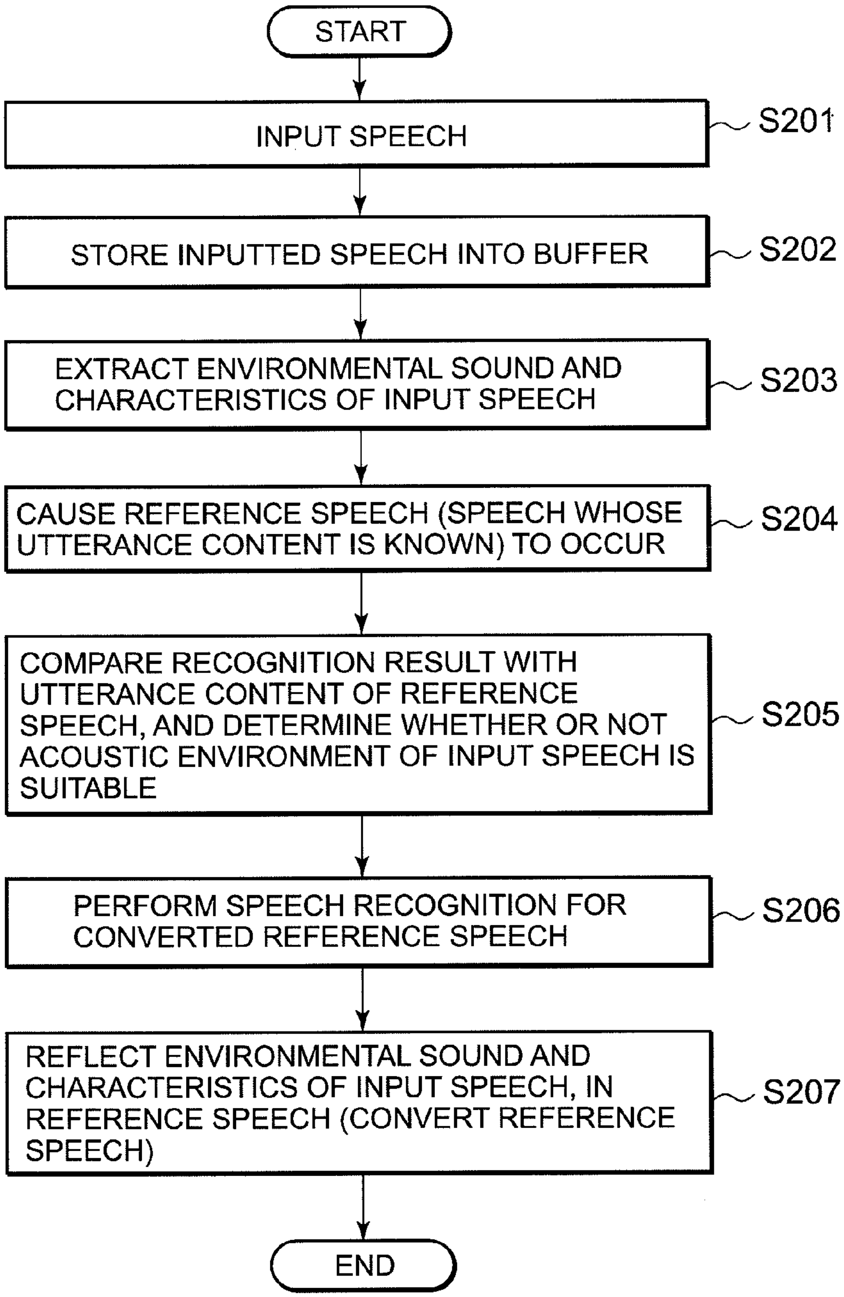
FIG. 5 is a flowchart showing an example of operations of the speech recognition system having the self-diagnosis function of another exemplary embodiment.

Next, the operations of the third exemplary embodiment will be described. FIG. 5 is a flowchart showing an example of operations of the speech recognition system having the self-diagnosis function of the third exemplary embodiment. As shown in FIG. 5, when the speech input unit 1 inputs the speech (step S201), the inputted speech is stored in the speech buffer 2 (step S202).

Next, for the input speech signal stored in the speech buffer 2 as a target, the environmental sound estimation unit 51 extracts the environmental sound and the characteristics of this speech at the time point when this speech has been inputted (step S203). Here, for example, the environmental sound estimation unit 51 estimates the acoustic environment of the input speech by extracting the non-speech section of the input speech as the information on the environmental sound. Moreover, for example, the SN estimation unit 52 estimates the characteristics of the input speech by estimating the SN ratio of the input speech, and obtaining the frequencies, the percentages, the distributions and the like of the clipping sound and the jumpiness in the input speech.

On the other hand, the speech having known utterance content output unit 81 causes the speech whose utterance content is known in this system, to output as the reference speech (step S204).

Next, in response to the estimation of the information on the environmental sound and the characteristics of the input speech, and also the output of the reference speech, the speech characteristic adding unit 6 adds the environmental sound and the characteristics of the input speech, in the reference speech (step S205). Here, first, the environmental sound output unit 61 causes the environmental sound to output, based on the estimated information on the environmental sound. Moreover, for example, the volume adjustment unit 62 adjusts the volume and the like of the reference speech based on the estimated SN ratio. Moreover, for example, the volume adjustment unit 62 may insert the jumpiness and the clipping sound into the reference speech, based on the estimated frequencies, percentages and distributions of the clipping sound and the jumpiness in the input speech. Next, the speech superimposing unit 63 superimposes the environmental sound generated by the environmental sound output unit 61, and the reference speech adjusted by the volume adjustment unit 62, to generate the reference speech (converted reference speech) converted so that the acoustics and the characteristics of the input speech are added.

When the converted reference speech is generated, next, the speech recognition unit 3 performs the speech recognition process for the generated converted reference speech (step S206).

Lastly, the acoustic environment determination unit 82 determines whether or not the acoustic environment of the input speech is suitable for the speech recognition, based on a result of the comparison between the recognition result for the converted reference speech and the utterance content of the reference speech that is the speech having the known utterance content (step S207).

As above, according to the third exemplary embodiment, it can be easily determined whether or not the acoustic environment of the input speech whose utterance content is not previously decided is suitable.

It should be noted that, in the speech recognition system having the self-diagnosis function of the third exemplary embodiment, for example, a result of the determination of whether or not the acoustic environment of the input speech is suitable can also be used in determination of whether or not the speech recognition result for the input speech is good, without being directly presented to the user. Moreover, for example, based on the result of the determination of whether or not the acoustic environment of the input speech is suitable, such a message for prompting the user to change the location, the time or the like and perform the input again may be outputted.

Figure 6:
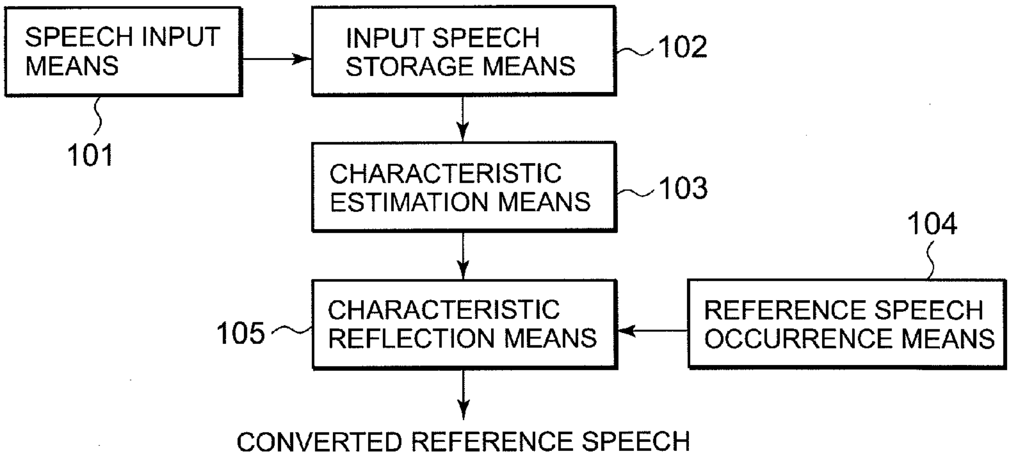
FIG. 6 is a block diagram showing a summary of another exemplary embodiment.

Next, a summary of the present invention will be described. FIG. 6 is a block diagram showing the summary of the present invention. As shown in FIG. 6, a speech signal processing system according to the present invention includes speech input unit 101, input speech storage unit 102, characteristic estimation unit 103, reference speech output unit 104, and characteristic adding unit 105.

The speech input unit 101 (for example, the speech input unit 1) inputs the speech signal. The input speech storage unit 102 (for example, the speech buffer 2) stores the input speech signal that is the speech signal inputted through the speech input unit 101.

The characteristic estimation unit 103 (for example, the speech characteristic estimation unit 5) refers to the input speech signal stored in the input speech storage unit 102, and estimates the characteristics of the input speech indicated by this input speech signal, and the characteristics include the environmental sound included in the input speech signal.

The reference speech output unit 104 (the reference speech output unit 4) causes a predetermined speech signal that becomes the reference speech, to output. For example, the reference speech output unit 104 may generate a guidance speech signal obtained by converting the guidance speech into a signal.

The characteristic adding unit 105 (for example, the speech characteristic adding unit 6) adds the characteristics of the input speech estimated by the characteristic estimation unit 103, to a reference speech signal that is the speech signal caused to output by the reference speech output unit 104.

For example, the characteristic adding unit 105 may generate a reference speech signal having characteristics equivalent to the characteristics of the input speech (a converted reference speech signal) by converting the reference speech signal based on information indicating the characteristics of the input speech signal estimated by the characteristic estimation unit 103, and the reference speech signal caused to output by the reference speech output unit 104.

Moreover, the characteristic estimation unit 103 may estimate the environmental sound to be superimposed on the speech, a too large amount or a too small amount of the speech signal, or missing of the speech signal, or a combination thereof, as the characteristics of the input speech.

For example, the characteristic estimation unit 103 may include environmental sound estimation unit for clipping the speech signal of the non-speech section from the input speech signal and estimating the environmental sound of the input speech signal; and SN estimation unit for estimating the ratio of the speech signal to the environmental sound of the input speech signal. Moreover, for example, the characteristic adding unit 105 may include environmental sound output unit for causing the environmental sound that is to be superimposed on the reference speech signal, to output, by using the information on the environmental sound estimated by the environmental sound estimation unit; volume adjustment unit for adjusting a volume of a speech in the reference speech signal based on the ratio of the speech signal to the environmental sound of the input speech signal, which has been estimated by the SN estimation unit; and speech superimposing unit for superimposing the reference speech signal whose volume has been adjusted by the volume adjustment unit, and the environmental sound caused to output by the environmental sound output unit.

Moreover, the characteristic estimation unit 103 may further include clipping sound/jumpiness estimation unit for estimating the frequency, the percentage or the distribution of the clipping sound or the jumpiness in the input speech signal. Moreover, the characteristic adding unit 105 may further include clipping sound/jumpiness insertion unit for inserting the clipping sound or the jumpiness into the reference speech signal, based on the frequency, the percentage or the distribution of the clipping sound or the jumpiness in the input speech signal, which has been estimated by the clipping sound/jumpiness estimation unit.

Moreover, the characteristic adding unit 105 may emphasize the estimated characteristics of the input speech, and add the estimated characteristics of the input speech that have been emphasized, to the reference speech signal.

Moreover, the speech signal processing system according to the present invention may include response speech output unit for performing the speech output of the converted reference speech signal that is the reference speech signal in which the characteristics of the input speech have been added, as the response speech to the user, the converted reference speech signal having been obtained as a result of inputting the speech signal of the speech uttered by the user as the input speech and causing the response speech for the input speech to output as the reference speech. Since such a configuration is included, for example, in an automatic response system, the user can instinctively judge whether or not the acoustic environment at the time when the user has uttered toward the system has been suitable for the speech recognition, by himself, while the system side is not conscious of where the user is located, when the user has spoken, and the like.

Figure 7:
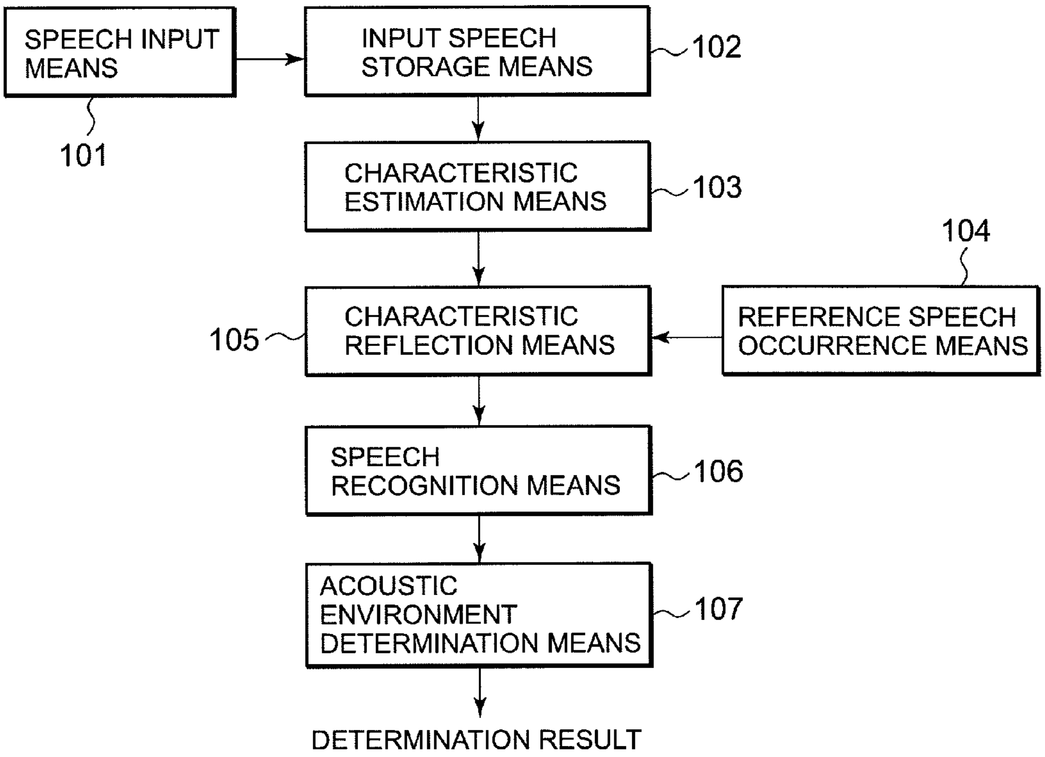
FIG. 7 is a block diagram showing another configuration example of a speech signal processing system according to another exemplary embodiment

Moreover, FIG. 7 is a block diagram showing another configuration example of the speech signal processing system according to the present invention. As shown in FIG. 7, the speech signal processing system according to the present invention may further include speech recognition unit 106 and acoustic environment determination unit 107.

The speech recognition unit 106 (for example, the speech recognition unit 3) performs the speech recognition process for the converted reference speech signal that is the reference speech signal in which the characteristics of the input speech have been added, the converted reference speech signal having been obtained as a result of causing the speech whose utterance content is known, to output as the reference speech.

The acoustic environment determination unit 107 (for example, the acoustic environment determination unit 82) compares the result of the speech recognition by the speech recognition unit 106, with the utterance content of the reference speech caused to output by the reference speech output unit 104, and determines whether or not the acoustic environment of the input speech is suitable for the speech recognition.

Since such a configuration is included, for example, in the speech recognition system having the self-diagnosis function, it can be easily determined whether or not the acoustic environment of the input speech whose utterance content is not previously decided is suitable.

Although exemplary embodiments have been described in detail, it will be appreciated by those skilled in the art that various changes may be made to the exemplary embodiments without departing from the spirit of the inventive concept, the scope of which is defined by the appended claims and their equivalents.

What is claimed is:

1. A speech signal processing system comprising:

an input speech storage that stores an input speech signal;

a characteristic estimation unit that refers to the input speech signal stored in the input speech storage, and estimates characteristics of the input speech, the characteristics including an environmental sound included in the input speech signal, and the SN estimation unit obtains powers of the non-speech portion of the speech and a speech portion of the inputted speech signal and estimates an SN ratio;

a reference speech output that causes a predetermined speech signal that becomes a reference speech to be output;

a volume adjustment unit that adjusts the volume of the reference speech according to the SN ratio;

a characteristic adding unit that adds the estimated characteristics of the input speech, to the output reference speech signal of volume adjustment unit.

2. The speech signal processing system according to claim 1, wherein the characteristic estimation unit estimates the environmental sound to be superimposed on a speech, the characteristics of the input speech based on at least one of a large amount of the speech signal, a small amount of the speech signal, and the absence of the speech signal.

3. The speech signal processing system according to claim 1, wherein the characteristic adding unit emphasizes the estimated characteristics of the input speech, and adds the estimated characteristics of the input speech that have been emphasized, the reference speech signal.

4. The speech signal processing system according to claims 1, comprising:

response speech output unit outputs the signal output by the characteristic adding unit as a response speech signal.

5. A speech signal processing method comprising:

storing an input speech signal;

referring to the stored input speech signal;

estimating characteristics of an input speech indicated by the input speech signal, the characteristics including an environmental sound included in the input speech signal;

obtaining powers of the non-speech portion of the speech and a speech portion of the inputted speech signal and estimating an SN ratio;

causing a predetermined speech signal that becomes a reference speech to be output;

adjusting the volume of the reference speech according to the SN ratio; and adding the estimated characteristics of the input speech, to the output reference speech signal.

6. A non-transitory computer readable storage medium storing a speech signal processing program to execute a method for causing a computer comprising an input speech storage unit to store an input speech signal that is an inputted speech signal, the method comprising:

storing an input speech signal;

referring to the stored input speech signal;

estimating characteristics of an input speech indicated by the input speech signal, characteristics including an environmental sound included in the input speech signal;

obtaining powers of the non-speech portion of the speech and a portion of the inputted speech signal and estimating an SN ratio;

causing a predetermined speech signal that becomes a reference speech to be output adjusting the volume of the reference speech according to the SN ratio; and adding the estimated characteristics of the input speech, to the output reference speech signal of volume adjustment unit.

7. An automatic speech response system comprising;

the speech signal processing system of claim 1;

a speech recognition unit which performs a speech recognition process for the input speech signal in the input speech storage;

a recognition result interpretation unit which extracts meaningful information from recognition result text outputted from the speech recognition unit and a response speech generation unit which generated a response speech from a result of interpretation by the recognition result interpretation unit.

8. A speech recognition system having a diagnosis function comprising;

the speech signal processing system of claim 1;

a speech having known utterance content occurrence unit which causes a speech whose utterance content is known, to output as the reference speech;

a speech recognition unit which performs the speech recognition process for the speech signal in the input speech storage;

an acoustic environment determination unit which compares a result of the recognition of a converted reference speech by the speech recognition unit with the utterance content of the reference speech generated by the speech having known utterance content output unit, to obtain a recognition rate for the converted reference speech.

9. The speech recognition system according to claim 8, wherein the acoustic environment determination unit determines whether the acoustic environment of the input speech is suitable for speech recognition based on a result of the comparison between a recognition result for a converted reference speech and the utterance content of the reference speech that is the speech having the known utterance content.

10. The speech recognition system according to claim 9, wherein a result of a determination of whether the acoustic environment of the input speech is suitable is used in determination of whether the speech recognition result is acceptable, and for notifying the user to change the location or time and perform the input again.

* * * * *